(12) United States Patent
Hauke et al.

(10) Patent No.: US 8,913,799 B2
(45) Date of Patent: Dec. 16, 2014

(54) METHOD AND DEVICE FOR ACQUIRING BIOMETRIC DATA

(75) Inventors: Rudolf Hauke, Niederstotzingen (DE); Giuseppe Parziale, Pfäffikon (CH); Hans-Peter Nothaft, Neu-Ulm (DE)

(73) Assignee: TBS Holding AG, Pfäffikon (CH)

(*) Notice: Subject to any disclaimer, the term of this patent is extended or adjusted under 35 U.S.C. 154(b) by 1909 days.

(21) Appl. No.: 11/667,113

(22) PCT Filed: Nov. 4, 2005

(86) PCT No.: PCT/EP2005/011841
§ 371 (c)(1),
(2), (4) Date: May 6, 2008

(87) PCT Pub. No.: WO2006/048311
PCT Pub. Date: May 11, 2006

(65) Prior Publication Data
US 2008/0260214 A1    Oct. 23, 2008

(30) Foreign Application Priority Data
Nov. 5, 2004  (DE) .......................... 10 2004 053 900

(51) Int. Cl.
*G06K 9/00*   (2006.01)
(52) U.S. Cl.
CPC ................................. *G06K 9/00033* (2013.01)
USPC ........................................................ 382/124
(58) Field of Classification Search
CPC .......... G06K 9/00013; G06K 9/00006; G06K 9/00026; G06K 9/00033; G06K 9/00067; G06K 9/0008; G06K 9/00087; G06F 21/32; A61B 5/1172
USPC ................... 382/115, 116, 124, 127; 356/71
See application file for complete search history.

(56) References Cited

U.S. PATENT DOCUMENTS

| 3,138,059 A | 6/1964 | White |
| 3,576,538 A | 4/1971 | Miller |
| 3,804,524 A * | 4/1974 | Jocoy et al. .................... 356/138 |
| 5,088,817 A * | 2/1992 | Igaki et al. ....................... 356/71 |
| 5,177,802 A * | 1/1993 | Fujimoto et al. .............. 382/124 |

(Continued)

FOREIGN PATENT DOCUMENTS

| DE | 3424955 | 1/1986 |
| DE | 101 53 808 | 5/2003 |

(Continued)

OTHER PUBLICATIONS

Einighammer et al (DE 10153808 A1), "Method for contact free optical generation of complete fingerprint images encompassing the whole finger ball, whereby partial overlapping images are obtained and then combined by use of the fingerprint line pattern structure", May 2003, Espacenet, pp. 1-5, (Machine translation).*

(Continued)

*Primary Examiner* — Edward Park
(74) *Attorney, Agent, or Firm* — Jacobson Holman Hershkovitz, PLLC.

(57) ABSTRACT

The invention refers to a device for collecting biometric data, in particular fingerprints, the device having an optically active detector for recording the surfaces of body regions. In the beam path between the surface and the detector a mirror is provided.

34 Claims, 7 Drawing Sheets

(56) References Cited

U.S. PATENT DOCUMENTS

Figure 1:
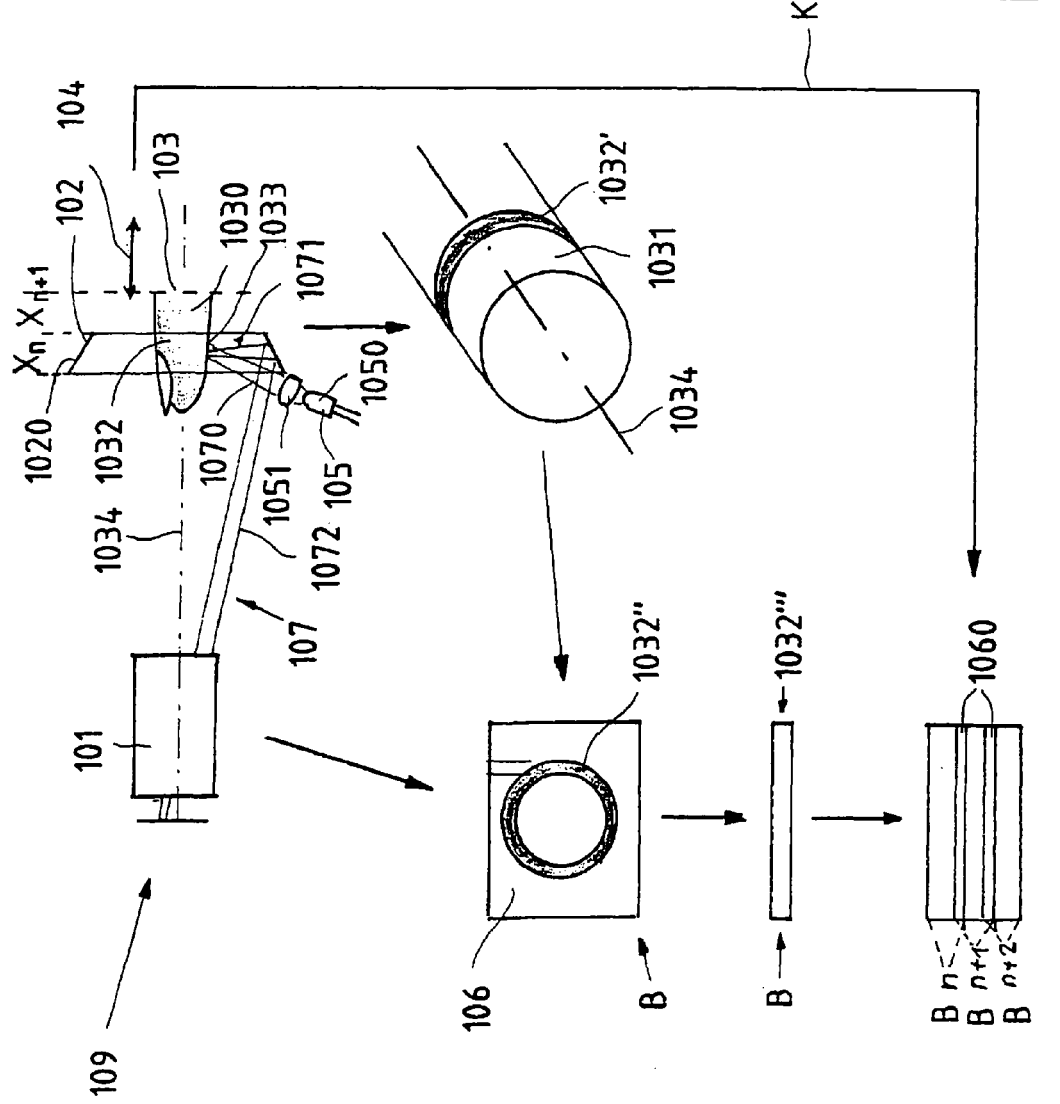

| | | | |
|---|---|---|---|
| 5,815,598 A * | 9/1998 | Hara et al. | 382/211 |
| 5,991,431 A | 11/1999 | Borza | |
| 6,175,407 B1 * | 1/2001 | Sartor | 356/71 |
| 6,636,701 B1 | 10/2003 | Vezard | |
| 6,657,185 B2 * | 12/2003 | Shiratsuki et al. | 250/227.2 |
| 7,308,122 B2 * | 12/2007 | McClurg et al. | 382/124 |
| 2001/0026636 A1 * | 10/2001 | Mainguet | 382/124 |
| 2002/0003892 A1 | 1/2002 | Iwanaga | |
| 2002/0106115 A1 * | 8/2002 | Rajbenbach et al. | 382/126 |
| 2003/0231788 A1 * | 12/2003 | Yukhin et al. | 382/115 |
| 2004/0114783 A1 | 6/2004 | Spycher | |

FOREIGN PATENT DOCUMENTS

| | | |
|---|---|---|
| DE | 10 2004 003 7 | 9/2005 |
| DE | 3424955 A1 | 1/2008 |
| WO | 99/41631 | 8/1999 |
| WO | 01/09817 | 2/2011 |

OTHER PUBLICATIONS

D. Maltoni, Handbook of Fingerprint Recognition, Jun. 2003, pp. 59-74, XP-002363594.

Geppy Parziale, "Touchless Fingerprinting Technology," Advances in Biometrics, 2008, pp. 37-38.

* cited by examiner

METHOD AND DEVICE FOR ACQUIRING BIOMETRIC DATA

This is a national stage of PCT/EP2005/011841 filed 4 Nov. 2005 and published in German.

The invention refers to a method and a device for collecting biometric data, in particular fingerprints.

In the state of the art devices and methods are known where in particular the device has an optically active detector for recording the surface of body regions.

Known methods use for that purpose a number of detectors, respectively cameras, which record partial regions of the finger profile with different aspect angles. It has to be taken into consideration here that essentially the finger print, that means the finger profile, is collected and described, however, the invention is in no way restricted only to these biometric features, but, if necessary, can be used also for other body parts, for example the palm etc.

According to the state of the art the individual pictures taken by the camera are equalised with methods of image processing, and combined in such a way that the line profile recorded in the transition region blend continuously and true to the original. This results in a complete picture which corresponds with a rolled, flat finger profile.

A disadvantage of the known methods is the fact that a number of cameras have to be used in the circumference, respectively the surface area, of the finger, which then record partial regions of the finger profile. This large number of cameras makes suitable devices uneconomically and expensive. It has also to be taken into consideration that the diametrical arrangement of cameras makes a recording at the same time of biometric data of different body parts, for example, different fingers, impossible as the individual devices needed for the finger cannot be installed in a narrow space. The result is that the recording process itself is comparatively expensive and long. Only the fingers of at least one hand can be collected at one time individually by these known arrangements. However, it takes additional effort in order to make sure that the assigning of the individual fingers of a hand is guaranteed.

Other methods, for example from the international patent applications PCT-EP 2005-000588 and PCT-EP 2005-001230, are known in the state of the art.

It is furthermore known in the state of the art to carry out a sequential series of recording of finger or hand lines. Such a process needs comparatively much time.

Large optically reproducing systems are known, which are comparatively expensive, for a large-scale identification of, for example, finger or hand lines.

It is also known in the state of the art described above to provide one device each for identifying the left and one for identifying the right hand. This means a very large effort in technical and installation respect, as both hands have to be scanned simultaneously.

Coming from this state of the art it is an object of the invention to find an arrangement which is as space saving as possible and to suggest a device which is designed simpler and thus more economically.

In order to solve this problem the invention refers to a device for collecting biometric data, as described in the beginning, and proposes that in the beam path between the surface and the detector a mirror is provided.

In the suggestions according to the state of the art a number of detectors are arranged diametrically around the body region. In order to get a reasonable image suitable distances have to be allowed for. This results in a corresponding large space which is required. The use of mirrors in the beam path makes it possible to design the arrangement of detectors spaced apart from the region of the support for the body regions. The detectors may be, for example, put in the back of the device making the construction of devices of this type clearly slimmer and more convenient.

The device according to the invention is here designed in such a way that in an embodiment one or two fingers can be placed on a support, at or behind which the mirror is arranged directly. This support may have a depth between 1.5 cm and 3.0 cm, and a width between 5.0 cm and 6.0 cm. Behind this support, for example, the mirror is provided as half-ring mirror, with a circumference of 0.5 cm to 2.0 cm, which is larger than the diameter of the thickest finger. The half-ring mirror is designed, for example, slightly cone-shaped so that the beams are deviated accordingly in order to be guided then, for example, through a lens to an optical sensor or detector or even to a camera. This detector, respectively the camera, converts the pictures into digital or optical data so that they can be evaluated accordingly. Of course, it is also possible to realise such an evaluation of data with optical data or with pictures similar to photographic pictures. The angle of the mirror is tilted at the cone about 5° to 45°. This also depends on the location where the light source, respectively the camera, is arranged. As light source in the sense of the invention here an artificial light source as well as a natural light source, for example daylight, has to be understood.

The distance of the optical sensors, detectors or the camera can now be chosen essentially larger as it has been possible before in the state of the art. In addition to that the accuracy of the evaluation is substantially higher as an essentially larger region of the plane of the finger or thumb or body region to be identified is possible by the ring-shape of the mirror. It is, of course, also possible to provide a cone-shaped mirror as open cone at the support through which then at least one finger has to be put in. Of course, it is also possible to design the support so wide that the complete palm can be supported. This means a width of about 10.0 to 15.0 cm, and a length of between 10.0 and 25.0, preferably 15.0 cm. This should be enough to make it possible to scan even very different sizes of hands. The width of the half-ring mirror or ring mirror may be designed in such a way that it records only a part of the front fingertip. However, the width can be designed in such a way that the complete width, respectively the length, of the finger can be scanned. Thus a length of 1 cm to 10 cm is possible. The invention is here not restricted at all. It rather depends on the conditions set for identification. Instead of a camera, of course, also an objective may be arranged behind which then an optical detector, respectively a sensor is joined which prepares the data accordingly. With regard to the direction of the beam path it is convenient when it extends essentially parallel to the supported body plane. However, it may even be deviated by suitable lenses in the beam path, respectively be split up or focused, depending on the identification means which is supposed to carry out the identification. In the case of a camera it is, for example, possible, to focus the beams. However, the beam path is not restricted to this parallel arrangement. An angular up to a rectangular design of this beam path with regard to the plane to be scanned is rather also comprised by the invention. The arc angle for the deviation mirror(s) comprises 0° to 360°, preferably about 180°.

Another advantage of the use of a mirror is the fact that the beam path may be folded by the mirror. This has advantages for the optical image with suitable objectives, respectively lens systems.

However the suggestion also offers the possibility that in a space-saving manner a number of similar devices according to the invention may be arranged one beside the other in order to record different body parts with them. Thus an arrangement is presented which makes it basically possible to collect in one recording step a number of different biometric data of one person. This has certain advantages of speed and safety in data collection. Thus it is possible to scan the complete hand, respectively parts of it, at least in the region of the carpus. It is also possible to scan the hand only partly, however, up to the base of the finger without any problem.

In the frame of the present invention often abstractly body regions are discussed, and also frequently recording of the fingerprints of a finger is mentioned in detail. In this respect the invention is not restricted to the use for recording the surface shape of a finger, that means a fingerprint, but it can be transferred analogously to all other concerned body regions. With biometric data collection, however, large data banks have been collected with respect to finger prints so that this field of application is accordingly interesting, exactly this field of application also being demanding for the data collection device. The reason is in particular that the finger is approximately a cylinder, and that the finger lines characteristic for a certain person, which form the finger prints altogether, are located at least on a part surface area of this cylinder.

But exactly the otherwise known "rolling" of a finger in order to obtain a finger print is accordingly complex in an optical collection of biometric data, as the surface area is not located in a focal plane and, nevertheless the data collection process should be concluded reliably in a short period of time.

In a preferred development of the invention it has been found to be convenient if the mirror is curved or bent, in particular designed U-shaped or like a half ring. Ideally the curved, respectively bent, or U-shaped, respectively half-ring-like, designed mirror is concentric to the ideal longitudinal axis of the finger. Such an embodiment achieves that the surface of the mirror follows the surface of the body region which has to be recorded, and thus, on the one hand, problems with the sharpness in optical images are reduced clearly, as the region of the depth of definition can be reduced accordingly, and, on the other hand, also the marginal regions of a finger, that are its side surfaces, can be recorded simultaneously as these marginal regions can be imaged by the correspondingly arranged mirrors designed as described above.

Therefore the invention makes it possible to image the finger region decisive for data collection, namely from nail to nail, in an angle segment of roughly 180° (this differs, of course, from person to person). The invention achieves here that for recording the finger profile only one camera is used which collects via the particularly shaped mirror a segment of the circumference of about 180°. It is possible here to form the mirror with a suitable width in order to image, for example, the complete region of the fingertip concerned in one picture on the detector. In addition to this modification according to the invention, however, a modification is suggested where a mirror is used which is correspondingly less wide (for example a few millimeters) which is able to transfer a corresponding segment of the circumference.

In another modification according to the invention it is provided that the mirror is designed as ring mirror. Here the ring mirror embraces the finger, respectively the body region. By means of that an image of the complete circumference of the finger is projected on the detector.

In the preferred modification of the invention it is provided that a conical shape of the mirror is used. The design of the cone achieves that the rays coming from the body region are deviated on the mirror in such a way that they extend, for example, with respect to the longitudinal extension of the body region, for example a finger, with respect to its longitudinal axis, essentially parallel or acute to it. This makes a transmission of this picture to a correspondingly remotely arranged detector possible in a simple manner, and in the beam path may be even an objective provided conveniently. According to a modification of the invention it is provided to image the complete concerned region of a fingertip with a mirror of suitable width. In another modification according to the invention, however, it is provided to use only a relatively slim mirror what has the result that the partial surface which can be scanned by the mirror is smaller in the relation with the complete surface of the body part which has to be recorded.

As according to the invention a device is striven for which saves space and is therefore constructed small, such an arrangement is convenient as relatively large mirrors are done without. In order to record, nevertheless, the complete concerned surface of the body part, that is for example the region of the fingertip, in another modification according to the invention it is provided to carry out a relative movement between the body region and at least the mirror.

This has the result that the detector records, according to the relative movement, a sequence of many individual pictures, each consisting of segments of the circumference, which then are filed into a storage accordingly correlated, and then are equalised with known methods for picture processing, and then are combined to a complete picture. The relative movement here is moved preferably parallel or essentially parallel to the longitudinal extension of the body region which has to be recorded, for example with a finger with reference to the ideal longitudinal axis of the cylindrical finger. The relative movement may be a result of a movement of the finger, or of a movement of the mirror. Both modifications are possible according to the invention.

As it is, according to the invention, provided to arrange the device preferably in a housing it is convenient to arrange an illumination for the body region which has to be scanned.

It has turned out here to be convenient to use a green light source as illumination as the green light source leads to pictures which are correspondingly rich in contrast.

The illumination is cleverly arranged below the body region and provided as closely as possible to the region of the body, that is for example a finger.

For an optimum illumination of the finger in the center of the picture of the detector light incidence is necessary from the direction of the detector. As the available space within the device is restricted, in particular when a complex construction is provided for simultaneously collecting of several body regions/fingers, this will lead to problems with the arrangement of the illumination, as the illumination may be visible for a view in any other picture of another detector. For that it is conveniently suggested that a semipermeable mirror designed as partial mirror is used which serves for the introduction of the illumination into the beam path. As it is convenient for space reasons, to deflect the paths of rays anyway advantageously partial mirrors are used here.

In order to realise a sufficient strong illumination LED arrays, preferably stripe-like, that means in a row one above the other or beside the other, preferably with directed radiation, for example through an illumination optic, are used.

It is a considerable advantage if in the beam path between the surface and the detector, in particular between mirror and detector an objective is provided. A segment of the circumference of width B is imaged by a deflecting ring mirror, a mirror as described in the beginning in detail, through the object as circle or circle segment with the width B' on the detector. The width B on the finger surface which can be used at a maximum is limited by the image errors which occur in the optical arrangement. Depending on the necessary local definition on the surface of the body region and depending on the used methods for calculating processing the individual pictures recorded by the detector, a maximum width B of the object for the individual picture exists. Advantageously here the magnification of the objective is determined in such a way that a local element which has to be defined on the body is imaged on an element, a so-called pixel of the detector. The magnification is determined here by the focal distance of the objective used, its image distance and object distance and the shape of the mirror.

Conveniently a telecentric image is provided. As telecentric a course is described which extends parallel to the axis of the main beams of an optical system. Telecentering used in the beam control makes the image editing which tops the detector in particular considerably easier. Eventually this leads to a reduction of measurement errors, respectively image errors, which otherwise, if necessary, should have to be filtered out with large effort during the image post-processing.

In order to achieve a telecentric image a front lens of the objective is required which corresponds at least with the size of the object. In a preferred modification here a rectangular front lens is suggested which comes close in particular to the shape of the object because of its asymmetric design.

In a preferred modification of the invention it is suggested that a relative movement is provided between the body region and at least the mirror. Several variants are possible to carry out this relative movement. First of all, it is possible that at least the mirror is stationary during recording and the relative movement is already derived from the movement of the body. Such a design does not require an additional drive. The introducing or removing movement of the body region, for example the finger, in and from the device is simply used. Here cleverly the movement of the finger is guided in such a way that the concerned region of the finger, its bottom surface, is guided over the mirror, and the detector records a sequence of individual pictures, that is a film of the surface structure. The respective pictures here have a corresponding small width, according to the chosen design of the mirror.

However, the relative movement may also be created in another way. It is, for example, convenient that a movement of the mirror, at least during recording the body region, is provided, and otherwise the body region itself is stationary, that means determined in a suitable manner. In this first modification at least only the mirror is moved, that is the optical component which "scans" the surface. Here in a suitable way naturally the complete optical unit is moved, as it is described in the following modification of the invention. It is suggested here that detector, mirror, and, if necessary, the objective are combined to a sensor head, and the sensor head can move, in particular move linear. Thus in the sensor head the optical parameters can be set once and remain defined. If, for example, the position of the mirror changes with respect to the detector, its objective or a separate objective, the picture had to be focused again by means of suitable correction lenses or post-corrections. Such a design is basically also possible in the sense of the invention, however, correspondingly more expensive.

In the sense of the invention also a movement of the mirror is provided. Of course, it is also possible, according to the invention, to turn the mirror. With that also advantages according to the invention can be achieved. Thus it is, according to the invention, provided to move the hand, the sensor unit or the mirror. If the mirror is moved the sensor unit, however, remains in the separating angle. This means it has to be equipped suitably turnably, if necessary, so that an image, respectively identification, is possible in each position of the mirror.

Cleverly the suggested sensor head is moved, for example, for recording the surface feature, roughly concentric over the finger surface and parallel to the finger surface which is an idealised cylinder surface area. Here cylinder stripes, respectively cylinder segments are imaged one after the other on the detector using a half ring mirror with a suitable local definition.

The invention also suggests a device for recording the characteristic lines of fingers, the device carrying more than five, in particular six, identification arrangements for the finger lines. The finger lines reproduction or identification device is thus suitable for identifying the left as well the right hand. The finger lines reproduction or identification arrangement has therefore on the left and right side a finger reproduction arrangement for the left and the right thumb. Thus one device can be used for identifying the left and the right hand. This saves the very large effort, necessary according to the state of the art, for providing two devices with five finger reproduction arrangements each for the left and the right hand. According to the invention now only six finger reproduction arrangements are provided, the finger reproduction arrangements located in the center being designed universally for collecting the fingers, and the respectively outer finger reproduction arrangements for collecting the left, respectively the right, thumb. The finger reproduction arrangement thus serves for collecting, respectively reproducing, the fingers as well as for collecting the thumbs. This saves considerable effort in the production of installations of this kind. Furthermore it is more convenient to operate such an installation. The devices known from the state of the art required both hands to be introduced simultaneously in the device. Now the hands can be introduced one after the other which is more convenient for the test person, respectively the person to be identified, as one hand is now free, for example for supporting or picking up a purse or other objects.

A development of the device described above is characterised by the fact that in the device a first part of the finger line reproduction or identification arrangement serves for identifying the finger lines of the first hand, and a second part of the finger line reproduction or identification arrangement serves for identifying the finger lines of the second hand. This is an advantageous development, as by means of that the different anatomy of the fingers is taken into consideration. By a clever arrangement of sensors, projectors and by the special kind of design of the planes now the identification of both hands is made possible even without particular adjustment to the respective anatomy.

A development of the invention suggests that one or more finger lines reproduction or identification arrangements are provided for collecting the finger lines of the first hand as well as of the second hand.

The invention is also characterised by the fact that one identification sensor each, in particular in the region of the finger lines identification arrangement of the left or right thumb is provided for identifying the first, respectively the second hand. By means of this sensor, for example, the identification arrangement is alerted that the left or right hand has been inserted. In this respect it is not necessary either to keep certain sequences when inserting. The device recognises automatically which hand has been inserted.

Another aspect of the invention is given by the fact that a supporting surface is provided for the hand, respectively the fingers, and a line sensor is provided in the supporting surface which extends over the complete width of the hand.

For recording the fingers lines, respectively the hand lines, now a relative movement between the hand and the line sensor is necessary. Contrary to the state of the art, where a "portrait" photograph has been taken, that means the surface to be reproduced was kept still, by means of this suggestion according to the invention now a sequence of relatively narrowly striped picture segments is produced, which then are prepared by picture processing technique and combined to a complete picture.

The advantage of such a design is considerable. First of all, the constructive effort for a device according to the invention is reduced considerably as only a relatively narrow line sensor has to be put in. This results therefore in a comparatively small construction of the device.

Here the invention comprises a solution where a line sensor extending longitudinally is provided as well as an arrangement of several line sensors one beside the other, respectively staggered to each other, which are suitable to record a certain partial length of the hand.

In a preferred modification of the invention it is provided that the device has at least one reproduction or identification arrangement for the superficies surface of the fingers. This combination of a reproduction or identification arrangement for the superficies surface for the fingers with the line sensor namely provides the opportunity to carry out comparatively complex projections in only one process step. The process is relatively complex because the fingers of the hand can be seen approximately as parallel or acute angularly arranged cylinders which are arranged relatively close to each other, and the characteristic superficies surfaces of the fingers are relatively close to each other. An individual rolling of the finger in order to get a superficies surface as complete as possible would be a possibility, however, this procedure is very time consuming. If, however, now a suitable reproduction or identification arrangement for the superficies surface for each single finger is provided, by simple putting the finger on the supporting surface of the device according to the invention it is achieved that the respective superficies surfaces of the fingers as well as the hand lines, respectively the finger lines, are recorded. This is here carried out during a single introducing and/or withdrawal of the hand in/from the device.

Suitable reproduction or identification arrangements for the finger lines are known, for example, from international patent applications PCT-EP 2005-000588 and PCT-EP 2005-001230. The contents of these patent applications are here referred to entirely, and they are seen as integral part of this application.

In order to make recording the superficies surface of the finger easier it is convenient that in the device several spreading means for the fingers are provided. These are arranged preferably at, on or above the supporting surface. The spreading means are designed, for example, like pins or cylinders, and are introduced in the spaces between the single fingers. A similar procedure, however, can also be carried out by suitable grooves in the supporting surface.

In a preferred embodiment of the invention it is provided that at least one lateral contact surface is arranged for guiding the side part of the hand, respectively the side of the hand. Such a contact surface makes operating the device much more easier. Simultaneously it is, however, also possible that in the supporting surface an image sensor is arranged which serves for recording, for example, biometrics information of the side of the hand or the back of the hand, that means, for example, suitable lines of the side or back of the hand.

It is provided here that a suitable contact surface is not only provided for the side of the hand, but, for example, it guides the side part of the hand at the hand between the index finger and the thumb. It is possible here that these regions are scanned accordingly with another image sensor, and the lines are collected accordingly.

The result is, in another convenient embodiment of the invention, that the hand is guided laterally by one contact surface each. One of these contact surfaces supports the hand at the side of the hand, the other, if necessary, the finger region of the hand at the index finger. Of course, it is optionally possible that both contact surfaces are equipped with one image sensor each.

In this respect the invention also provides in a modification that a contact surface is provided, of course, also for the back of the hand, that is the top side of the hand. Here, for example, the position of this contact surface may change, it can recede slightly. Thus it is basically also possible to collect also the back of the hand, namely if the respective contact surface is also equipped with an image sensor.

An advantageous development of the invention is characterised by a lateral, in particular angular or rectangular mobility of the contact surfaces for the pull-back movement of the hand. The result is that these contact surfaces do not interfere during the different contact of the left or right hand. The concerned contact surface which would interfere is either stopped and pulled back as sequential series, or moved back through an automatic identification, respectively a key sensor, optical sensor or the like, so that the possibly interfering contact surface does then not interfere. For the identification procedure they are again moved back so far as the identification installation requires it for a reliable identification.

An advantageous development of this modification provides an adjusting means, for example a spring, for the movable contact surface in order to guarantee that the spring pulls back the contact surface on its own, and then corresponding means are provided in order to position the contact surfaces when a hand is put in.

Cleverly the contact surface in the region of the reproduction or identification arrangement for the superficies surface of the finger is exempted in order not to obstruct the optical beam path, or to impede the quality of the picture by soiling the contact surfaces.

The effect is to collect the biometrics information, the hand lines, respectively finger lines, that is, contact-free. By means of a suitable groove in the supporting surface or a suitable distance or the lack of other supporting surfaces for the finger a distortion-free reproduction is realised that is not falsified by corresponding distortions by pressing the finger to respective surfaces and so on.

For a collection as fast as possible of all picture information it is convenient that each finger has its own reproduction or identification arrangement for the superficies surface of the finger.

In a preferred modification of the invention it is provided that the reproduction or identification arrangement for the superficies surface of the finger is formed by a deviation mirror, if necessary a projection lens, as well as a picture recording unit. The use of a deviation mirror makes it possible to carry out the picture recording unit for the reproduction and/or identification of the superficies surface of the finger spatial at another place. Such an arrangement can therefore be used for optimising the place arrangement accordingly. Optionally the use of a projection lens is convenient, it can be deleted if it is not required.

Furthermore the invention provides conveniently that the deviation mirrors of adjoining reproduction or identification arrangements for the finger lines are arranged staggered to each other. As the angle region between the fingers quite limited, and the test person should not be subjected to a large spreading of the fingers, which would be unpleasant, it is convenient to arrange the deviation mirrors (which are, for example, constructed spaciously) of adjoining reproduction or identification arrangements for the finger lines staggered to each other in order to prevent space problems from occurring.

The same goes, of course, also if one reproduction or identification arrangement for the finger lines has several deviation mirrors, and then, if necessary, some of these deviation mirrors of one reproduction or identification arrangement for the superficies surface of the finger can be positioned staggered to each other.

In another convenient embodiment of the invention it is provided that the reproduction or identification arrangement for the superficies surface of the fingers comprises several deviation mirrors, and each deviation mirror projects individual regions of the superficies surface of the fingers. Such a division of the reproduction or identification of the superficies surface of the fingers into several individual deviation mirrors may have advantages in the realisation of corresponding devices according to the invention. Thus it is therefore possible to use comparatively simple planar deviation mirrors each of which is then are arranged angularly around the finger. Here plane or flat or even mirrors have to be understood. They can be produced much more economically than for example circular or semi-circular mirrors.

The deviation mirrors are here arranged preferably edge on edge in order to produce an image as free of interruptions as possible. It has to be taken into consideration here that a certain overlapping region has to be kept. The pictures of the invention namely are not combined as in a panoramic picture, but they are generated by providing overlapping regions as an exact three-dimensional picture (3-D-model). For such a case of use then, for example, as a convenient modification in each case plane deviation mirrors which can be produced easier can be used.

The invention suggests furthermore that the image recording unit is a plane image sensor or line sensor. As a plane image sensor here, for example, a two dimensional sensor or camera has to be understood. These are designed, for example, in CCD technology and can be read out line by line. If, for example, a ring-shaped deviation mirror is used, a ring-shaped image is projected to a two-dimensional image recording unit. However, it is also possible to design the image recording unit as a line or row sensor; the plane picture is then achieved by means of a correspondingly swift read-out of the sensor (similar to the two dimensional image sensor). Generally the suggested image sensors, respectively line sensors, are also described in the following as sensors. Conveniently it is furthermore provided according to the invention that the sensor is designed, for example, as colour camera, that means it can record colour pictures.

The width of the sensors is small compared to the surface to be recorded as eventually a recording film is made, preferably during the pull-back movement (or relative movement) of the hand, respectively the finger relative to the image recording unit. The recorded pictures are then combined to a two or three-dimensional picture. Thus also with a plane image sensor the regular read-out of the image information is necessary, such a sensor comprising correspondingly more information, and can possibly only be read out with a lower clock rate.

Here the use of a line sensor is advantageous which can be read out much more faster, and thus allows to provide larger amounts of data, improving the quality of the image as per line unit a larger number of image information per line is generated. A line sensor of this kind is economic.

In a preferred embodiment of the invention it is suggested furthermore that the regions of the superficies surface of the finger projected by one of several deviation mirrors is recorded by one region each of the line sensor. Although a number of deviation mirrors, preferably planar deviation mirrors is provided in a reproduction or identification arrangement for the lines of fingers, the respectively deviated picture information is again transmitted to a sensor, respectively preferably a line sensor. It is the use of a fast read-out line sensor which combines here the simple design of the sensor, a simple design of the deviation mirror, in particular as planar mirrors with a fast read-out speed of a suitable line sensor. This is an advantage especially for collecting large amounts of data.

Besides the advantages already described it has to be mentioned again that flat or planar mirrors can be produced much more economically, and this makes the production of the complete arrangement for collecting biometrics data altogether more economically. In a convenient modification of the invention it is, for example, provided to arrange five planar or flat mirrors of this kind in such a way that they embrace about 180° of the object to be projected. By means of that then, for example, the complete bottom part of a finger could be reproduced until approximately the center seen spatially. Another modification suggests, of course, arranging five mirrors of this kind at the circumference region of the object to be reproduced embracing 360°. With that also very accurate projections, in particular spatial projections, of the object to be recorded can be generated. Of course, also the modification with five mirrors can be completed in 180° by using another five mirrors in the spatially remaining 180°, that means also for a complete circumferential projection of 360°. Here then ten mirrors would have to be provided. The described modifications are only preferred modifications. The invention is in no way restricted to them.

Cleverly here adjoining deviation mirrors, in particular designed planarly, will project the respective superficies surfaces of the fingers to adjoining sensor regions. By means of that the combination of the pictures afterwards becomes considerably easier. It is, of course, possible to vary the procedure accordingly, in particular if this is more convenient with respect to the optical beam path of the information.

Of course, alternatively, instead of a sensor for the majority of deviation mirrors, for each deviation mirror its own sensor can be provided. Then it is possible to provide smaller individual sensors each of which then can be read out singularly faster. The read-out therefore has to be carried out correlated, that means clocked, respectively triggered, the picture information is then not combined to a complete picture line by line, but, first of all, the lines are generated from the single partial regions and then combined. By such an embodiment the speed is increased for the read-out of the pictures, however, also the effort increases in order to complete the single pictures afterwards to a complete picture.

Furthermore, it has been found in a preferred modification of the invention that light of different wavelengths for illuminating the finger, respectively the hand, is used in order to serve in particular for generating a spatial image of the superficies surface of the finger, respectively the hand.

By means of the process known as fractal image processing it is possible to achieve three-dimensional pictures in a comparatively simple way.

Here in particular the use of a two or more coloured illumination and the combination with a colour camera is convenient. For example, the colour camera is arranged in the center of the surface to be monitored. Both light sources are arranged symmetrically before and behind the scanning plane. If now the normal vector of the scanned surface points to the plane of the camera, the camera recognises both colours at equal parts because of the symmetric arrangement. If the surface tilts in one direction, as, for example, with a groove, the reflection angles change and the colour shares become dissymmetrical. The relation of the colour shares leads to conclusions concerning the tilting of the surface. If both components are subtracted against each other plane surface parts disappear, and, on the other hand, corresponding elevations or indentations with 3-D-structure are clearly discernible against the background. Such a design is possible accordingly, for example, also with the use of a usual illumination or a "white lamp".

With respect to the design of the deviation mirror the invention is very variable. It is, for example, possible to use a ring- or half-ring-shaped deviation mirror which leads to very good results, as it will be described later on. However, it is possible in the same way to use a flat, respectively planar, or even cone-shaped deviation mirror, the production in particular of the flat, respectively planar, deviation mirror being clearly more economically.

When a ring- or half-ring-shaped deviation mirror is used it is more convenient that the arc angle of the ring, respectively the half-ring, is 0° to 360°, preferably 0° to 220°, in particular preferably 0° to 180°. Seen in the view the arc angle comprises the angle region in which the ring- or half-ring-shaped deviation mirror is arranged. As a recording from nail to nail is the aim it is be sufficient, with certain applications, to realise a half-ring-like design, here, for example, an angle region up to 220° being convenient in order to reproduce also the adjoining finger regions reliably. In a slightly more simple design therefore already a half-ring-like design up to 180° may be sufficient.

However, it is also possible to realise only the arc angle of 60°, 90° or 45°. In such a case the deviation mirrors are arranged just on the bottom surface of the finger, and project preferably these regions. It is, of course, also possible to use different segments of deviation mirrors comprising smaller arc angles. This may be an advantage especially with arrangements where space is a problem.

In another, even simpler, modification it is provided that the reproduction or identification arrangement for the finger lines is formed by an individual line sensor.

An essential advantage of the invention is in particular the fact that the complete device according to the invention is designed modularly. Thus it is possible that the used line sensor itself, for example, is constructed modularly. However, it is also convenient that, depending on the desired equipment, the device can also be equipped then individually with a reproduction or identification arrangement for the finger lines, and/or with an image sensor, for example for recording the side of the hand, respectively other side surfaces of the hand. Thus it is possible to realise and to adjust the device to the respective customers desires in a simple manner in the way of a modular system.

It is also convenient that, for example, the line sensor, the reproduction or identification arrangement for the finger lines, respectively the image sensor or their contact surface are each designed modularly which also makes the construction accordingly convenient. Thus it is, for example, possible to chose the arrangement in such a way that different mirrors in the reproduction or identification arrangement for the finger lines co-operate with a projection lens.

In a preferred embodiment of the invention it is provided that an image recording key, in particular at a spreading means, is provided which serves for the start of recording the finger or superficies surface line and/or the single superficies surfaces of the fingers. By means of the image recording key suggested according to the invention the test person himself or herself actually triggers the recording of the finger, respectively hand, lines. The test person must introduce his or her hand in such a way into the device that the image-recording key is activated. The recording is then carried out preferably with the pull-back movement of the hand which guarantees that the relative movement is carried out. This makes data processing easier and increases data security.

According to the invention it is, of course, also possible, to provide generally a relative movement of the hand relatively to the device for the use according to the invention, that means the use of the device as well as the application of the method, also according to the invention, is possible with the introduction as well as the pull-back movement.

The arrangement of the image recording key is provided conveniently at a spreading means, the arrangement then being chosen in such a way that the image recording key cannot be activated unintentionally, but only when actually the hand has been introduced completely, and, for example, the region between two fingers has contact with the surface of the spreading means. Then, for example, also the image recording key is activated. If necessary, other suitable switches or keys correlating with each other may be provided in order to prevent a faulty operation reliably. The test person is alerted to that by suitable acoustic or visual information, after that he or she withdraws the hand and the lines are recorded accordingly.

Besides an activation of the image recording key by the region between two fingers it is, in another modification of the invention, also possible, however, that, for example, the fingertips activate the image recording key. In this case the image recording key is not supported by the spreading means.

Furthermore it is suggested, according to the invention, that the deviation mirror is arranged close to the spreading means.

The object of the use of the deviation mirror is to project the superficies surface of the finger as completely as possible, that means with regard to the arc angle as well as with regard to the length of the finger.

Recording the surface area of the finger is done here also preferably during the pull-back movement of the hand. If the deviation mirror is arranged as close as possible to the carpus the complete finger can be recorded. With respect to the construction this means that the deviation mirror is arranged as close to as possible or in the region of the spreading means as the spreading means will be located in the angle region between two fingers, that means the base of the carpus. Therefore it is, according to the invention, already sufficient that the deviation mirror, with respect to the introduction, respectively pull-back, movement of the hand is situated at the same level as the spreading means in order to be close.

The problem according to the invention is furthermore solved by a collection arrangement which serves for simultaneously collecting biometric data of different body regions, the collection arrangement being equipped with at least two devices for collecting biometric data, and the device having at least one optically active detector for recording the surface of body regions. Here a first device is provided for recording a first body region, and a second device for recording a second body region, and the collection arrangement has a spreading device which spreads the body regions in such a way that even lateral recordings of the body regions are possible by the detector. Interesting for collecting biometric data are in particular fingerprints, as already described. Different body parts according to the above-mentioned definition thus are different fingers of a hand, finger and thumb, or finger and at least parts of the palm. Very important for a biometrics collecting arrangement here is the collecting of the hand, at least up to the part where the fingers join the palm, that means the region of the carpus. Thus attempted deceits must fail completely as the arrangement which now is able to recognise and assign the finger regions as well as the reproduced part of the palm, so that tampering is not possible anymore.

The suggested collection arrangement according to the invention uses, among others, here also the device according to the invention described above for collecting biometric data. However, the invention is not restricted to it, the arrangement may also interact, if necessary, with devices designed in another way. The essential advantage of this embodiment of the collection arrangement is the fact that it is possible to record by the detector also lateral pictures of the body region, these are, for example, the lateral surfaces of the fingers.

In particular the embodiment of the device suggested in the beginning with a mirror shaped for example U-like or half-ring-like makes it possible to image these lateral surfaces almost as a nail-to-nail picture on the detector. The embodiment is here altogether even very space-saving as for each individual finger only one detector, respectively one camera, has to be used, so that such an arrangement can be realised accordingly space-saving. Without any problems here several devices could be realised one beside the other, for example in order to collect in one collection process two body regions, for example two fingers or even all fingers of a hand, including the thumb.

Here the collection arrangement suggested according to the invention also implements at the same time an exact assignment of the respective recorded pictures. If, for example, the collection device is designed in such a way that all fingers of one hand can be collected, that is scanned, respectively recorded, then also the position of the hand is determined. The manufacturing of a control print which makes possible exactly the assignment of the pictures taken from the individual fingers with regard to the complete hand, is not necessary. The required time for collecting the biometric data is reduced, and simultaneously the data security is increased, and even the necessary data processing is reduced at the same time, as the control print does not have to be compared with the single takings of the fingers.

The spreading effect does not only have the advantage that the lateral regions of the fingers which have to be recorded can be imaged, the spreading has also the effect that the detectors which are, as a rule, at a small distance to the tips of the fingers have a corresponding larger distance from each other. As also the beam paths of the individually recorded fingers are orientated with a suitable spreading angle, the detectors are spaced from each other according to the radiation rules.

In a modification of the invention it is suggested here that the hand has to be put with straight fingers on the arrangement for recording in such a way that all fingers are in one plane, however, between the fingers a sufficient distance remains in order to make a lateral image of the single fingers possible. This is achieved by a spreading device which spreads the fingers of a hand in a defined, naturally comfortable way. By means of spreading, regions of the fingers are visible which otherwise are concealed by the side faces of the fingers, and thus are available for the recording procedure.

In a modification according to the invention it is provided that the spreading device is designed as stoppers, in particular cylindrical stoppers, which have to be arranged between the body regions, in particular between the fingers of a hand, and the mirror device is located below the body regions, for example the fingers. The arrangement has to be seen here in such a way that the mirror is arranged in such a way below the device that the mirrors face the finger surface, respectively the palm. Here the hand is placed on or in the collection arrangement in such a way that one cylinder each is located between two fingers. Of course, it is possible to realise a glove-like design making it possible to guide the fingers of a hand even more exactly. Different hand sizes can be taken into account by different sizes of the arrangement in the same as with gloves.

Conveniently it is striven for that the spreading device effects a spreading of the fingers of a hand inserted into its collection arrangement of 10° to 20° each, preferably about 15° between two adjacent fingers. It has been found that such an angle distance is sufficient in order to image in particular the finger tip region in a satisfying quality in a circumference region of about 180°, preferably in particular from nail to nail.

In another modification according to the invention it is also provided to use for example the housing of a ring mirror as part of the spreading device.

It is, in the sense of the invention, equivalent whether the fingers of a hand are inserted into the collection device according to the invention or whether they are put on it accordingly.

In another preferred embodiment of the invention it is provided that the collection arrangement has a support surface in which slots or openings with optically transparent covers are provided, and the mirrors each are arranged in the region of the slot, respectively the indentation. The imaging of the body regions, in particular of the fingers, is supposed to be carried out touch-less. As the space between the fingers is very narrow, the recording installations cannot be provided in this region. In order to prevent the sensitive optic from being contaminated a suitable distance has to be provided.

This means that suitable measurements have to be taken, so that, on the one hand, a secure positioning of the mirror around the body region which has to be recorded is possible, and, on the other hand, contamination is prevented reliably. For that purpose it is convenient that the collection arrangement has a support surface in which slots or openings are provided with optically transparent covers, and the mirrors each are arranged in the region of the slot, respectively the indentation. The optically transparent covers can easily be cleaned in a simple manner, and they are suitably transparent for the used light rays. By means of a simple distancing, as it is, for example, possible with the arrangement of a slot, the same may be accomplished.

In another preferred embodiment of the invention it is provided that the support surface forms grooves for receiving fingers, respectively the palm, and the arrangement of the grooves effect a spreading. In order to increase the operability of the collection arrangement it is convenient to imbed the recorded hand in such a way that it is guided optimally. This is conveniently achieved by a suitable groove-like design of the support surface. Similar to the negative print of a hand the support surface has a corresponding design which additionally also may act as spreading device as, by means of that, also a corresponding guide of the finger is possible. Here this groove-like design of the support surface may effect a spreading on its own, or it may be provided additionally to other spreading devices.

In another preferred modification of the invention it is provided that two devices share one objective. Advantageously these are two adjacent devices. As the available space in the collection arrangement according to the invention is very narrow—all fingers, including the thumbs, of both hands of a person are supposed to be collected with one device— such a suggestion leads to a corresponding saving of space as the number of the required objectives, which actually also need accordingly space, may be reduced. It is, for example, provided to use a double objective which may be used for two or even more detectors. They will then be focused individually.

It is convenient that each finger has its own movable sensor head, and adjacent sensor heads each are movable in opposite directions. In a modification of the invention it has already been described that it is convenient that the detector is located with reference to the axis defined by the longitudinal extension of the body in front of the body region. Transferred to the use on a finger this means that the (idealised) longitudinal axis of the cylindrical finger carries the detector in its prolongation to the front facing away from the hand. In order to adjust the optic once it is convenient to integrate all optical elements, that means the mirror, the objective and the detector in one sensor head, as for scanning the complete surface of a finger a relative movement is decisive, this will be performed by the sensor head altogether. If all sensor heads are located, orientated in the same direction, in front of the respective fingers, even with a suitable spreading of the fingers there might arise a problem of space. It is then convenient to chose for one or the other sensor head a reversed arrangement in such a way that the detector is not located in front of the finger, but, for example, in the region below the palm. This may be realised by a simple re-construction, respectively a mirror which is orientated in another way, in a simple manner. Thus also the region below the palm may be used for the arrangement of sensor heads.

Of course, it is, according to the invention, also provided that all mirrors are located below the hand to be reproduced. This is another preferred modification of the invention.

In a preferred modification of the invention for each finger an individual movable sensor head is provided, and each sensor head can move in longitudinal direction, in particular in the direction of the longitudinal extension of the respective finger. It is already sufficient here that a mirror which embraces the circumference line of the body region, respectively the finger, is moved in the axial direction of the cylinder-like finger. In the sense of the invention, however, it is also possible, and this goes also for the device used in the collection arrangement to the same extent, that the mirror images a surface area line parallel to the longitudinal axis, and, by the way, the mirror, respectively the sensor head (depending on the design) follows the surface area on a radial path. This is also an object of the invention.

In particular, when a movement of the sensor head or the mirror is provided as relative movement, it is favourable to provide a locking arrangement of the hand and/or the individual fingers on or in the collection device. By means of that it is possible to position the body regions which have to be recorded exactly and to get an image as sharp as possible.

In order to optimise the time for recording the hand or finger lines further, a collecting apparatus is suggested which serves for recording the finger and hand lines of a test person which comprises a double arrangement, preferably reflected arrangement, of two devices as described. Such a collection apparatus is characterised by a very simple and therefore economic construction, at the same time by simultaneously collecting both hands the collection time is reduced considerably. The waiting time for the test persons, for example during access controls, is lowered accordingly.

The problem according to the invention is also solved by a method for collecting biometric data with the features described in the following.

In the methods known according to the state of the art the single pictures taken by a number of cameras/detectors are combined in the picture processing accordingly to a complete picture. Here, as a rule, simultaneously pictures are taken by several cameras, respectively detectors, from different angles to the body region. Here an exact splitting of the angle segment recognised by the respective detector is decisive in order to get an exact picture, in particular in the edge region, that is in the contact region of the individual pictures, which is, if necessary, collected by the first or the second detector. The geometric conditions therefore are accordingly complicated and therefore also prone to errors. Even the taking of a series of pictures simultaneously with a number of detectors may not be a secure procedure in order to get a complete image of the idealised cylindrical surface area of a finger.

It is once again more pointed out here that not only the recording of fingerprints is the aim but also that the method according to the invention as well as the device according to the invention can be used in the same way for each body region. In particular the invention contributes to the technical image collection of non-planar body regions, like the finger, or the palm, respectively a part of her, reliably.

Referring to the described problems in the state of the art in picture processing now, according to the invention, it is suggested that a detector records at least one picture of a first partial surface of the surface of the body region which has to be collected, after that a relative movement between the detector and the body region is carried out, after that the detector takes at least one picture of a second partial surface of the surface of the body region which has to be collected.

It is like taking a film across the surface of the region of the body by the detector. This film comprises a high number of individual pictures, for example in axial direction of a finger. Of course, the frequency of picture recording is chosen such that at least one picture is recorded from the surface per minimum width of the mirror (which might be smaller than the actual physical width of the mirror). However, this is not a regular problem with modern high performance cameras, respectively detectors. In particular thus a number of pictures are available which overlap each other which provide an image editing without any problems.

Here conveniently such a large number of redundant or essentially redundant pictures are produced so that, for example, even error calculations in the picture processing, respectively correlation calculations, are possible for optimising the image.

The method according to the invention extents first of all to the fact that the detector carries out a relative movement with regard to the surface of the body region which has to be recorded. However, in the same way the problem mentioned at the beginning is solved by a method for collecting biometric data, where a sensor head comprising a detector and an imaging optic records at least one picture of a first partial surface of the surface of the body region which has to be recorded, after that a relative movement is carried out between the body region and the sensor head, respectively parts of the sensor head, and after that the sensor head records at least one picture of a second partial surface of the surface of the body region which has to be recorded.

In the top region of this application it is, in particular, described that a mirror, in a preferred modification a half ring mirror or a ring mirror carries out a relative movement with regard to the surface of the body region. According to a modification of the invention it is not decisive that also the detector moves together with the mirror, respectively the optic, the optical conditions of which remain therefore during the recording unchanged. This may also be solved in another way in the sense the invention. Therefore the invention also comprises a solution where a sensor head comprising a detector and an imaging optic or even only parts of the sensor head, that is, for example only the mirror, carries out a relative movement.

The advantages described above of such a procedure are also contained in this method according to the invention.

Conveniently the relative movement is parallel or essentially parallel to the longitudinal extension of the body region. As already described in connection with the device the relative movement may be derived either from the movement of the body region, that is the finger or the hand, or from the movement of the optical elements (detector, sensor head and so on).

In this connection it is in particular pointed out that all features and characteristics, but also procedures, described with reference to the device can be transferred accordingly even with reference to the formulation of the method according to the invention, and can be used in the sense of the invention, and are seen as disclosed as well. The same goes vice versa, that means, construction, that is device, features only mentioned with regard to the method may also be taken into consideration and claimed in the frame of the device claims, and also count as part of the invention and disclosure.

The method according to the invention aims at producing a number of pictures where it is, according to the invention, provided that the detector correlates the pictures recorded from the partial surfaces, and files them in their sequence in storage. This correlation is important in particular for the image which has to be produced of the complete recorded surface.

It is an advantage for the subsequent picture processing that at least the pictures of the first and second partial surfaces overlap. Between the recording of the first and the second partial surface a relative movement occurs. Thus another region of the surface is imaged. In order to create an image without interruptions out of these individual pictures it is convenient to provide a corresponding overlap region through which in particular the exact connection of the individual partial pictures to each other, but also reference points for equalising, respectively error calculation and so on, may be derived.

With reference to the method according to the invention it is convenient that in the beam path between the body region and the detector a mirror, which is sectional curved, respectively bent, is provided, if necessary as part of the imaging optic, and the detector records a picture of the curved partial surface. The result of this suggestion according to the invention is that images are projected ring-like or U-like bent to the detector. In this respect, of course, the design of the detector has to focus on that, and in particular the finishing may be optimised in this respect as, first of all, always only in a certain region known because of the imaging optic an image may occur. By such a consideration in the design of the device in the method the picture processing has to accelerate accordingly.

The method according to the invention also includes a picture-processing module which combines the pictures filed in the storage to a three-dimensional image of the recorded surfaces. This is done with known methods of picture processing. This picture processing, however, reaches, for example, the production of an image of the surface area of a finger, for example of a three-dimensional image. In another step it is possible then to obtain a "rolled-off", planar image out of these picture information. By means of the a data set of biometric data is created which may be compared, for example, with already existing finger prints, produced by ink, and may also be collected as data.

In this connection the picture-processing module produces, if necessary, even an equalising of the image, which is designed as complete picture, and/or of the respective single pictures taken from the partial surfaces.

The problem referred to at the beginning is also solved by a method for recording the finger, respectively hand lines, where the recording of the superficies surface of the finger is carried out simultaneously with the recording of the hand lines. By this simultaneous procedure the required recording time, that means the time during which the respective test person has to remain at the device, is reduced considerably.

The recordings are done here separated spatially in such a way that the superficies surface is collected in the front region preferably by the described reproduction or identification arrangement for the finger lines, and the hand lines by another sensor, for example, the also already described line sensor. Of course, the reproduction or identification arrangement for the finger lines records also finger lines of the superficies surface of the fingers as the finger lines, respectively the hand lines, identify persons.

Conveniently it is provided that a comparison, a control, respectively an assignment of the recorded bottom superficies surfaces of the fingers is done. This increases the data security, respectively the accuracy and authenticity of the data accordingly, and, of course, also the quality of the information is improved. In particular it is also provided that, if the hand trembles before, during or after the control step of the procedure, to carry out a picture correction step. This picture correction step consists of an algorithm for eliminating the trembling as it is, for example, used in photographing. It has to be taken into consideration here that the picture processing generates additionally of course a complete picture out of the recorded film of the superficies surfaces of the fingers.

In a preferred embodiment of the method it is provided that in particular when colour sensors, respectively colour cameras, are used a space picture of the superficies surface of the fingers, respectively the hand, is generated. Thus, for example, the sensor of the image recording unit of the reproduction or identification arrangement for the finger lines or the line sensor is designed for recording the bottom surface of the hand as a colour sensor in order to generate accordingly colour pictures. By means of picture processing, respectively preparing, and using the effect of the fractal light (as described above, which is referred to entirely in the method according to the invention) it is now possible to calculate a three dimensional reproduction through the picture information provided in any way planarly. In a suitable way here the information of the different colour sensitive regions of the sensor are processed and evaluated. Thus it is now possible with very little effort, for example while using only planar mirrors and the method described above, to achieve a three dimensional reproduction.

Figure 2:
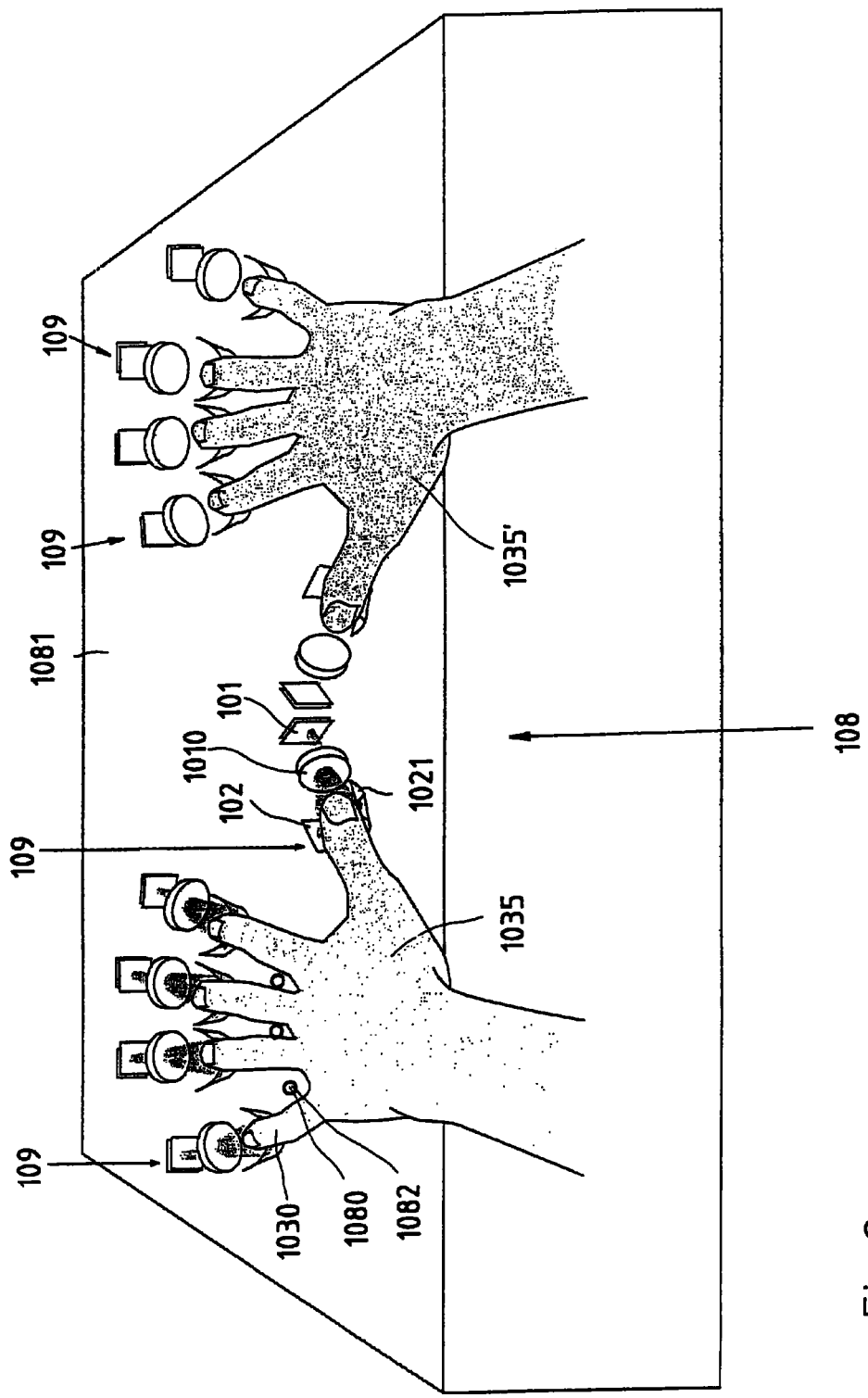
Figure 3:
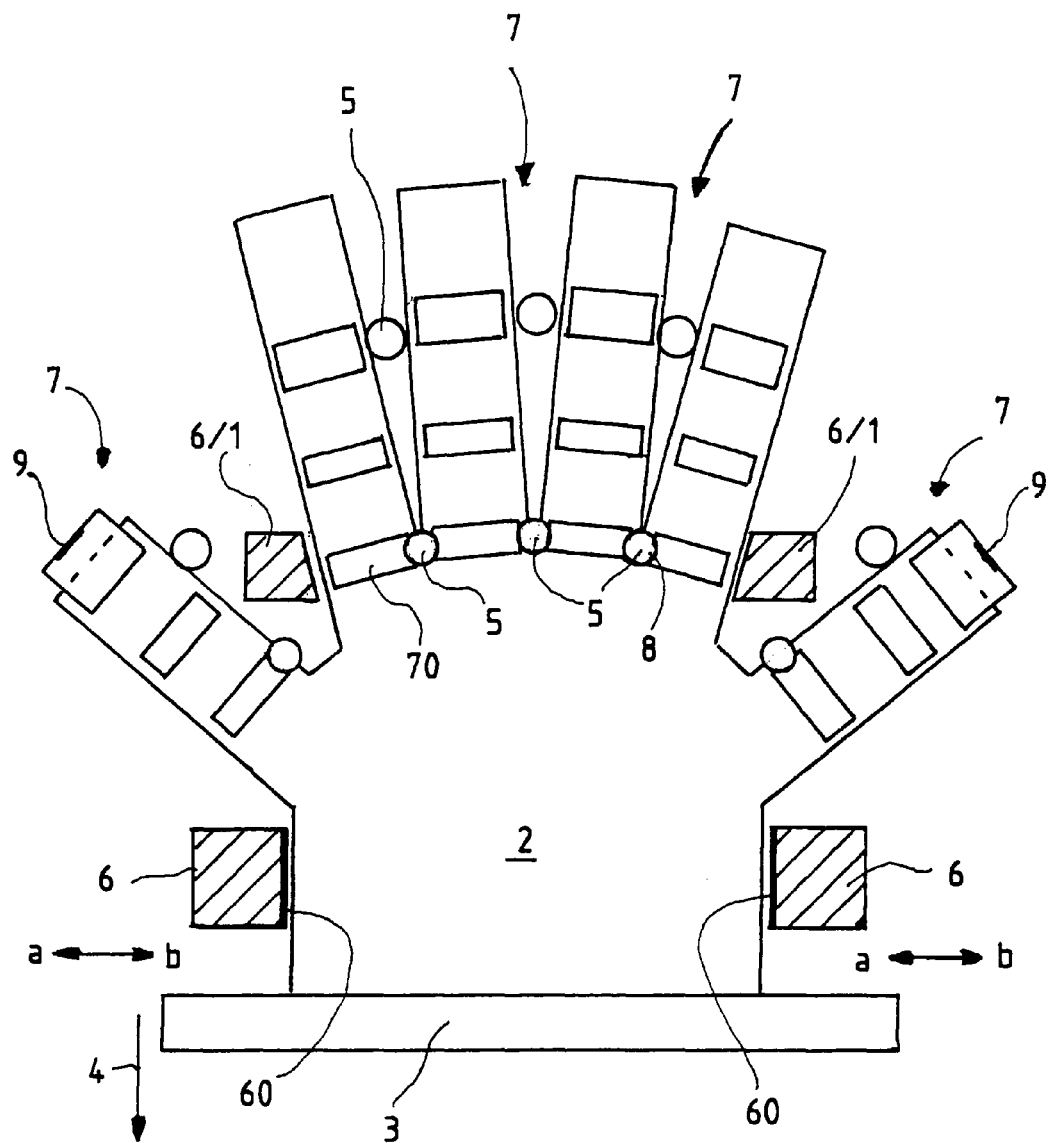
Figure 4:
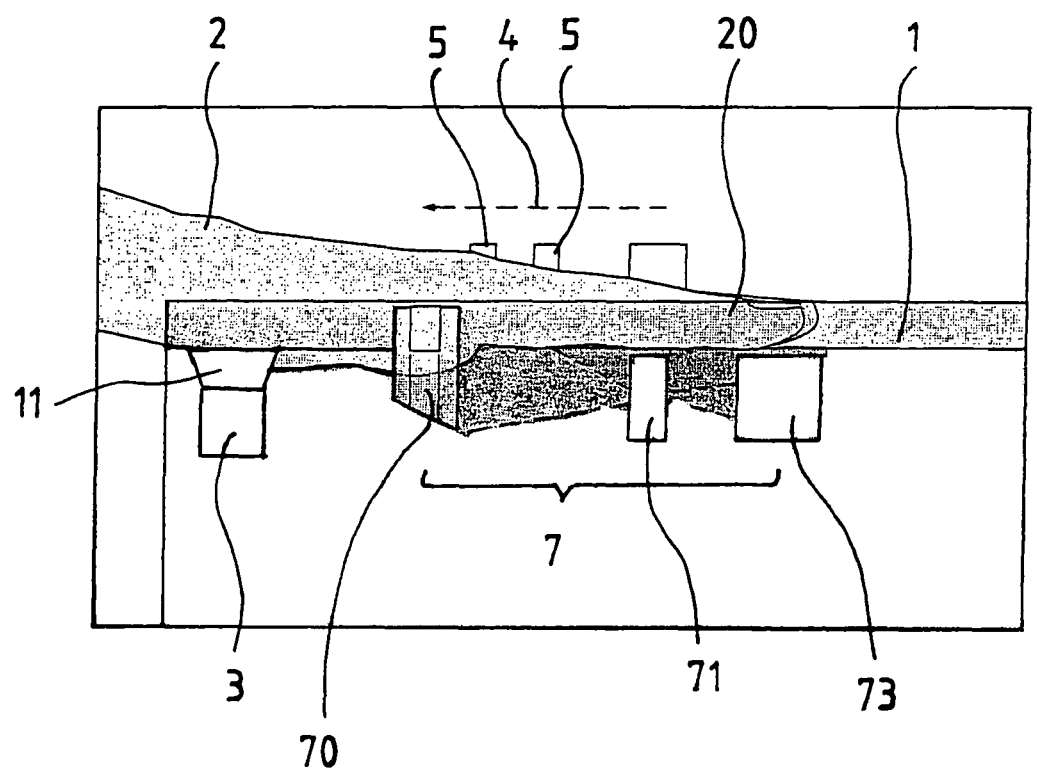
Figure 5:
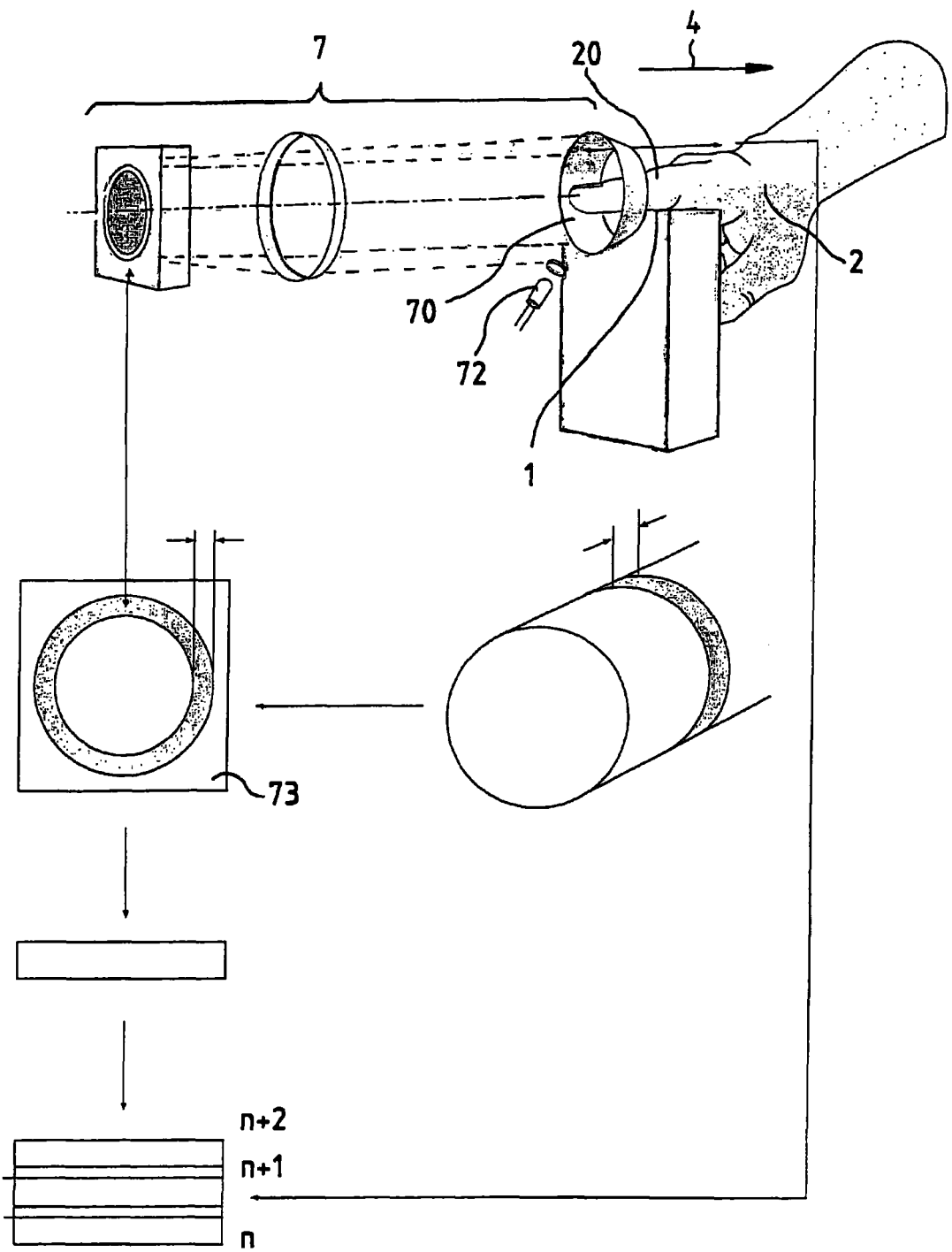
Figure 6:
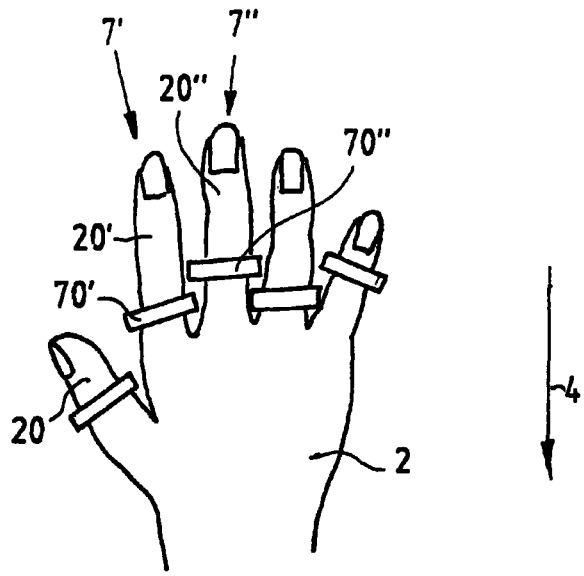
Figure 7:
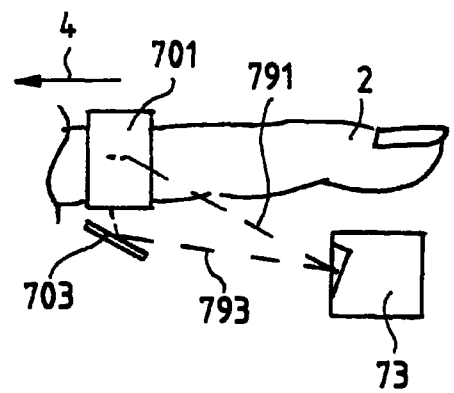
Figure 8:
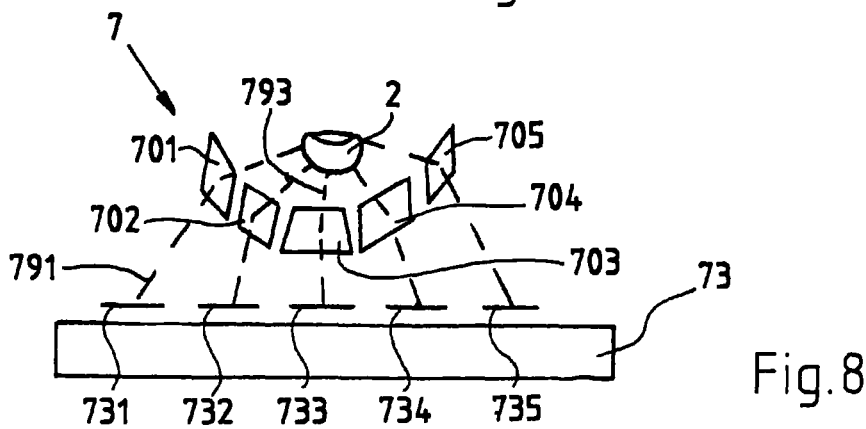
Figure 9:
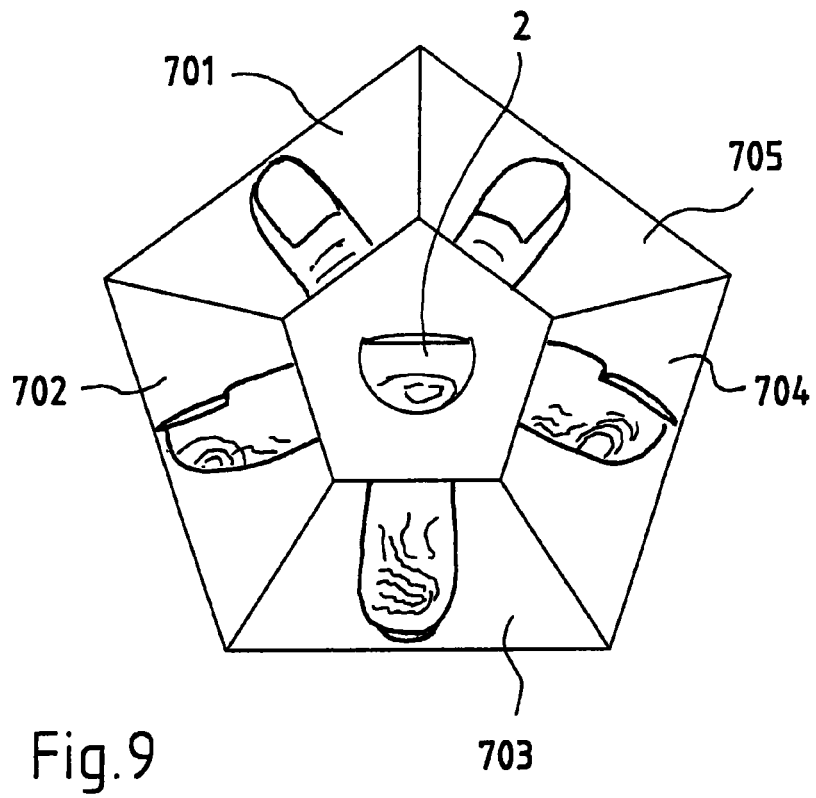
Figure 10:
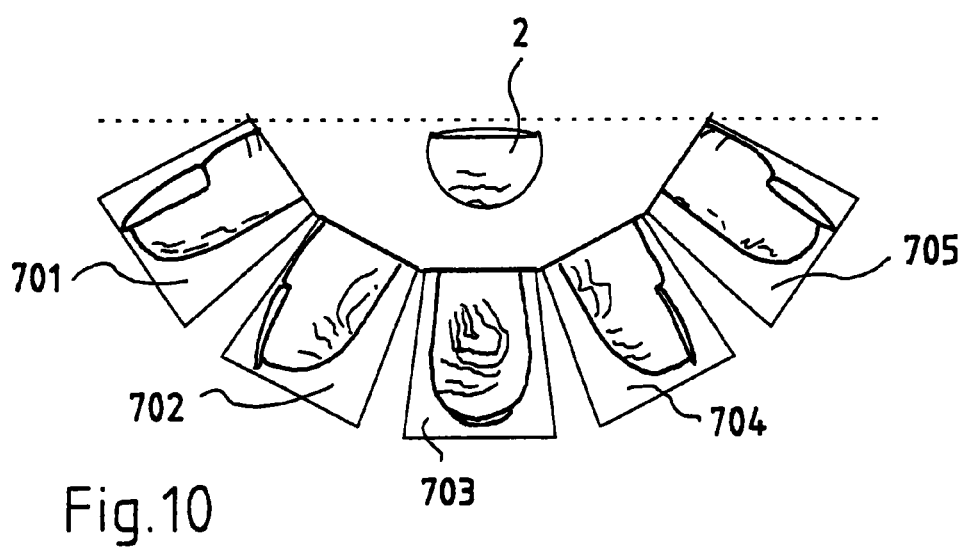

In the drawing the invention is shown schematically. In the pictures:

FIG. 1 a schematic overlook of the method according to the invention, including the device according to the invention, FIG. 2 a schematic view of the collection arrangement according to the invention, FIG. 3 a top view of an embodiment of the device according to the invention, FIG. 4 a side view of a device according to the invention, FIG. 5 in an overall view the way of operating of the reproduction or identification arrangement for the finger lines according to a device of the invention, FIG. 6 a top view of another embodiment of the device according to the invention, FIG. 7 in the side view a modification of the reproduction or identification arrangement for the finger lines according to a device of the invention and FIG. 8 a top view according to FIG. 7;

FIGS. 9 and 10 modifications of mirror arrangements according to the invention.

In FIG. 1 the way of operation of the device according to the invention and the method according to the invention is shown schematically.

Object of the invention is a device for collecting biometric data, for example finger prints, the device having an optically active detector 101 for recording surfaces of body regions 103, for example a finger 1030. An essential part of the invention is the fact that in the beam path 107 between the surface 1033 and the detector 101 a mirror 1020 is provided. In the example shown here the mirror 1020 has a defined width. It is designed ring-like, thus embraces the finger 1030, respectively the body region 103, completely. It has a conical shape so that the beam path 107 results as indicated.

Reference number 105 indicates an illumination. It consists in this embodiment of one or several LEDs 1050 the emitted light of which is focused by an illumination optic 1051 to the surface 1033 which has to be recorded. The beam path from the illumination to the surface which has to be recorded is referred to by 1070.

The light reflected by the surface 1033 is imaged in a first beam path 1071 by the ring mirror 1020 because of its cone-like shape to the front, with reference to the longitudinal extension of the body region 103 to the detector located in front of the body region 103 along the beam path 1072.

The finger 1030 which has to be recorded in this embodiment can be idealised and simplified as cylinder 1031. The cylinder 1031 has here a longitudinal axis 1034 which is included as aid in the top region of FIG. 1. The detector 101 is located with reference to that on the prolongation of the longitudinal axis 1034 in front of the finger.

In the schematic drawing shown here the special imaging optic, the objective which is required for detector 101, is not shown in detail. It is, for example, integrated in detector 101 and not indicated separately.

Because of the width of the mirror 102 a circumference segment 1032 of the surface 1033 is projected to the detector 101. This is done in a first position $X_n$.

Below the drawing of the finger in the ring mirror 1020 the idealised cylinder 1031 is indicated; 1032' indicates the cylindrical surface area. Because of the conical shape of mirror 102 a ring-like picture 1032'' is created in the detector by this circumference segment 1032'. This picture is indicated by reference number 106, and is located on the left hand side besides the idealised cylinder 1031. In picture 106 which is, for example, the picture recording level of detector 101, the cylindrical surface area 1032, 1032 is projected into a ring-like structure 1032''.

It is important that, with reference to the relative position $X_n$ from mirror 102 to the body region 103, clearly a picture $B_n$ can be assigned. Here not the precise measuring is decisive, but it is sufficient to state this correlation.

The image 1032'' shown in picture 106 as ring contains eventually information about the three dimensional design of the recorded surface 1033.

Ideally this information is stored, for example, planar, as it is indicated for example in the next processing step, and indicated by reference number 1032'''. However, this is only a means for supporting the drawing, of course the three-dimensional data are also stored, administered and calculated three-dimensionally.

According to the method of the invention a first picture $B_n$ is created from a first position $X_n$, and filed by the detector in storage.

Then a relative movement 104 is carried out, preferably parallel or essentially parallel to the longitudinal extension, respectively longitudinal axis 1034, of the body region 103, respectively the finger 1030.

At the spot $X_{n+1}$ a second partial picture $B_{n+1}$ is recorded, and loaded also by the detector into the storage to another storage space. The recording speed and the width of the mirror are here adapted to each other in such a way that there is an overlapping region 1060 of the single pictures, in order to line up the respective single pictures $B_n$, $B_{n+1}$, $B_{n+2}$ and so on accordingly. Because of the known width of the mirror and the imaging relations by means of that also a scaled, that is correct scale, image is created which can be taken into consideration for calculation accordingly. Arrow K is the correlation between the relative movement 104, which leads to the different positions $X_n$, respectively $X_{n+1}$ and so on, on the one hand, and secures the reference to the respective pictures $B_n$, $B_{n+1}$ and so on, on the other hand.

In the following picture processing module again a complete picture, in particular a three dimensional image of the recorded surface 1033, is created and evaluated and provided from the single pictures $B_i$.

In FIG. 2 the collection arrangement 108 according to the invention is shown schematically. The essential advantage of this collection arrangement 108 according to the invention is the fact, that the support surface 1081 can support all fingers 1030 of both hands 1035, 1035', and for each finger, including the thumbs, a device 109, according to FIG. 1, is provided. For simplicity's sake the device 109 is shaped each time by the mirror 102, the objective 1010 and the detector 101, the exact construction corresponds, for example, with the arrangement shown in FIG. 1 in the top region.

The essential advantage of this invention is in particular the fact that an arrangement of the devices 109 is possible which is very space saving, making a simultaneous recording of all fingers of the hands of a test person possible. This results in a considerable acceleration of the procedure for collecting biometric data.

As the mirror 102 in the example detailed in FIG. 2 is shaped like a U 21, a picture recording from nail to nail is achieved which is sufficient, as a rule, for data collection. In order to reach in particular the side region, that is the finger region up to the nail, it is convenient to provide a spreading device 1080. This is formed, for example, by cylindrical stoppers 1082 which are positioned between the fingers in the region of the carpal bone when the hand 1035 touches or is inserted in or at the collection arrangement 108.

The way of function of the invention has to be described in particular in the combination of FIG. 3 and FIG. 4. In FIG. 3 the hand, respectively the fingers are not shown. However, it can be seen in the drawing that a hand can be put in there.

According to the invention a device for recording the finger or hand lines is suggested, the device having a supporting surface 1 for the hand 2, respectively the fingers 20. In the supporting surface 1 a line sensor 3 is arranged. It can be seen clearly that the line sensor 3 shown here is wider than the hand 2.

In order to prevent the line sensor 3 from being soiled in the supporting surface 1 a groove 11 is provided, and thus there is a distance between the palm and the surface of the hand facing the line sensor 3.

FIG. 3 shows that the device is suitable for collecting the finger, respectively hand, lines of a right as well as a left palm of a hand. For that purpose the device has more than five, namely in the drawing six identification arrangements for the finger lines. The advantage is obvious as instead of five additional identification arrangements for the finger lines for the other hand here only one is required additionally. This makes the invention very economic. The identification arrangement for the finger lines arranged on the left hand side of the drawing is intended, for example, for supporting the right hand, the very left identification arrangement for the finger lines being intended for the right thumb. The identification arrangement for the finger lines on the right hand side serves for collecting the thumb of the left hand when it is introduced. In order to make sure that the hand can be inserted without any problems the contact surfaces 6 on the left and right side in the direction of the double arrows a, b are designed movably. The contact surfaces 6 are located on left and right hand side so that both surfaces can be pulled back in order to insert the hand without any problems. Preferably the contact surfaces 6 are provided for that purpose with adjusting means, for example a spring, in order to secure an automatic draw-back. Interior contact surfaces 6/1 serve for optimal inserting, respectively positioning, of the fingers. The identification arrangements for the finger lines far on the left and far on the right hand side also carry recognition sensors 9 by means of which it can be recognised whether a left or right hand has been introduced.

FIG. 3 shows that the length of the supporting surface 1 is dimensioned in such away that the complete hand can be supported. An essential advantage of the invention is in particular the fact that in one step a number of biometric data, namely hand and finger lines, can be recorded without the risk of mixing-up. Here data which can be received comparatively easily, namely the finger or hand lines located on the bottom surface of the palm, but also information about the surface area of the finger which can be received comparatively complex, is recorded at the same time. The construction altogether is very shortly, this is, in particular, effected by the fact that the line sensor 3 has a clearly smaller width in relation to the length of the hand 2. In order to record the complete bottom surface of the hand with the line sensor 3 a relative movement 4 is necessary. This relative movement 4 is reached in the embodiment of the invention realised here by a pull-back movement 4 of the hand 2. This is also indicated by the arrow in FIG. 2. However, it is, of course, also possible to design the line sensor 3 like a beam, and design it moving forwards starting with the carpus in order to generate an image in this way. Both modifications are part of the invention, although the modification with a stationary line sensor 3 has advantages as there no additional drives have to be designed, and the test person has to move his or her hand anyway.

In order to get a guide of the hand 2, which has to be recorded, as exactly as possible different means are provided. For example, contact surfaces 6 are provided which guide, for example, the side part of the hand 21. Contact surfaces 6 of this kind are located on the left and right of the hand in such a way that the hand is guided between them. The thumb is spread to the left from the left contact surface 6 (see FIG. 3).

The contact surface 6 is designed, for example, as a block or rail, and in particular equipped with an image sensor 60 in order to gain further information concerning the side of the hand. The image sensor 60 too is, for example, slightly set back compared with the contact surface in order to avoid soiling. The image sensor 60 extends, for example, rectangular across the support surface 1.

It is possible furthermore to provide in the supporting surface 6, for example, touch contacts or sensors in order to detect the presence of a hand to be recorded. By activating this sensor it is possible to trigger the recording procedure.

The invention furthermore provides a number of spreading means 5 which extend, when the hand 2 has been introduced into the device, in the space between the single fingers 20. At the same time they form a border of the introduction path of the hand 2 in the device.

In the front region of the device, in particular in the region of the fingers 20, the reproduction or identification arrangement 7 for the fingers is arranged (see FIG. 4). It serves for recording the superficies surface of the finger 2. The particular embodiment of this arrangement is shown in particular in FIG. 3.

FIG. 3 shows that each finger 20 has its own reproduction or identification arrangement 7 for the finger lines. This makes it possible to record in one step of the procedure all fingers and, if necessary also the lines of the thumb, which can, in this respect, also be under stood as finger.

In order to avoid faulty image recordings the supporting surface 1 has a recess in the region of the reproduction or identification arrangement 7 for the finger lines so that the supporting surfaces do not become soiled.

The way of function of the reproduction or identification arrangement 7 for the finger lines can be seen in particular in FIG. 5. However, it also is shown in the international patent application PCT-EP 2005-001230. As already described the contents of the this international patent application are referred to entirely.

By means of the relative movement 4 of the hand 2 the finger 20 is pulled back through the ring-shaped deviation mirror 70. An illumination 72 is provided which illuminates the superficies surface of the finger. The reflected light is projected via the deviation mirror 70 and a projection lens 71 (see FIG. 4) to the image recording unit 73.

Ideally the finger 20 corresponds to a cylinder. The deviation mirror 70 is designed cone-like, and projects a sleeve-like superficies surface to a circular disc. The further picture processing is carried out here computer controlled.

By means of the pull-back movement 4 eventually a film is recorded across the surface of the superficies surface by the image recording unit 73. This film is then randomised into a complete picture by electronic picture processing.

An essential advantage of the invention is in particular the fact that also simultaneously complex data, like the superficies surface of the finger as well as the bottom side of the hand, which can be obtained relatively easily, respectively the bottom side of the fingers, can be gained with the respective lines.

The test person puts his or her hand 2 into the device according to the invention, the fingers 2 are spread by the spreading means 5 in such a way that the individual fingers 20 are assigned the respective reproduction or identification arrangements 7 for the finger lines. On a spreading means 5, for example, an image recording key 8 is provided. This key acts as a switch and activates the recording automatics. If now the test person pulls back his or her hand, by means of the reproduction or identification arrangement 7 for the finger lines the superficies surface of each finger is recorded, and, simultaneously, respectively immediately after that, in any case, however, during the pull-back movement 4 the bottom surface of the hand is recorded by the line sensor 3. Anyway alternatively also the side pictures are recorded by the image sensors 60. The recording of these two different groups of pictures is carried out simultaneously, however, first of all, of course, the superficies surfaces of the fingers is recorded with respect to the fingers, and, after that, when the finger has been pulled out wide enough, the line sensor records as sensor for the finger lines of the bottom surface of the fingers. The arrangement is here chosen in such a way that the line sensor 3 produces a complete picture in order to state in particular the geometric position of the different fingers and thus also act tampering- and mixing-up-proof. It is, for example, the object to be able to assign reliably, for example, the very left picture the data field "little finger". For that according to the device of the invention it is furthermore provided that a comparison, a control or an assignment of the recorded superficies surfaces of the fingers to the respectively recorded bottom surfaces of the fingers is carried out. In addition, also a complete picture of the hand lines is produced, which is also interesting for biometric data collection.

It has to be mentioned here that the relative length is already sufficient for the identification whether it is the left or the right hand. It has turned out that in no case the little finger is longer than the middle finger. In this respect already the length of the fingers determines whether it is the left or the right hand. The modification already mentioned in the description, according to which at least a part of the palm, for example up to the region of the carpus, is recorded, is even more convenient in order to exclude tampering, and to be able to recognise reliably whether it is the left or the right hand. This modification is even more convenient as besides the superficies surfaces of the finger lines also at least a part of the palm, respectively of the hand line, picture is obtained. Tampering is excluded entirely in this way.

In FIG. 6 another modification according to the invention is shown. The hand 2 is here introduced into the device, the deviation mirrors 70', 70" are designed, for example, as ring-like deviation mirrors. It has to be taken into consideration that the deviation mirror 70" for the middle finger 20" is arranged at a small distance to the carpus. It does not form a straight line with the other adjoining deviation mirror, the mirror 70' of the adjoining reproduction or identification arrangement 7' for the finger lines, it is slightly staggered. It is indicated that the deviation mirrors 70', 70" are clearly larger than the diameter of the finger 20', 20". In order to avoid a collision of the adjoining mirrors 70', 70" the deviation mirrors are staggered in particular with respect to the pull-back movement 4. This saves space.

In FIGS. 7, 8 another embodiment of a reproduction or identification arrangement for the finger lines according to the invention is shown. FIG. 7 does here not correspond completely to a side view according to FIG. 8, for clearness sake in the view according to FIG. 7 the mirror 702 is deleted.

In contrast to the design of, for example, FIG. 4 the modification according to FIGS. 7, 8 a number of deviation mirrors 701, 702, 703, 704, 705 is provided which are arranged along the circumference of the finger 2 stripe-like.

In contrast to the modification according to FIG. 4 where a ring- or half-ring-like deviation mirror 70 is used, here planarly designed, single small deviation mirrors 701, 702, 703, 704 and 705 each are used. They may be drawn here spaced apart, actually, however, they have butt contact in order to result in a complete image of the superficies surface of the finger. For a better view they have been shown spaced apart. The collection is here carried out always with suitable overlap areas, that means not side by side, but partly overlapping in such a way that adjoining regions each have always common overlapping areas.

It is clearly cheaper to create a deviation mirror 70 according to such a design as they each can be designed as single, in particular planar or flat, deviation mirrors.

Another advantage of the invention is contained in the fact that the image recording unit 73 in the example shown here is designed as line or row sensor, and produces an image which is more or less one-dimensional. The drawing in FIG. 8 is here very schematic. It is conveniently provided that the sensor used here is a colour sensor, respectively a colour camera, in order to use the effect of fractal light, in particular for generating a three dimensional image of the superficies surface of the finger, as it will be described later on.

Now the arrangement is chosen in such a way that the left region of the superficies surface of the finger (according to FIG. 8) of finger 2 is projected via the very left deviation mirror 701 through the optical path 791 to the region 731 of the sensor 73. Thus different image regions are defined, and it is in particular convenient that different superficies surfaces are projected to a line sensor 73. As the single mirrors 701 to 705 are each in contact with one another also a complete reproduction is reached.

Thus, for example the center bottom region of the finger 2 is projected via the narrow path 793 via the deviation mirror 703 to the center region 733 of the image recording unit 73. The single regions adjoining each other, which project the regions of the superficies surfaces of the fingers, are indicated with 731 to 735. It has to be emphasised that the arrangement in FIG. 6 is very schematic.

The chosen arrangement here is such that the image recording unit 73 is staggered with respect to the pull-back movement 4 from the arrangement of the deviation mirrors 701 to 705 (see FIG. 7). Thus it is possible to realise a complete image of the superficies surface of the finger 2 to a line sensor as image recording unit 73.

Economic production cost for the single deviation mirrors 701 to 705 are added here to a simple image recording unit 73 which can, in particular, be read out very fast if it is designed as line sensor.

It is furthermore suggested according to the invention that the image recording unit 73 of the embodiment shown in FIG. 7, respectively FIG. 8, is designed in particular as colour sensor. The arrangement, however, may be either a two dimensional sensor or a line sensor. The use of a colour sensor as image recording unit 73, however, presents the opportunity to calculate, after the effect of fractal light, a three dimensional image in the picture processing in a simple way.

According to a convenient design of the invention a colour sensor is provided for spectroscopic collecting and evaluating the object. This is, in particular, an advantage as by means of this the evaluation of the object in connection with a living recognition function is possible. This is in particular important to avoid that by means of artificial models a biometric recognition or identification arrangement is manipulated.

FIGS. 9 and 10 show models, how the concerned body region 2 can be recorded and projected with a ring-shaped arrangement of plane mirrors around the body region to be recorded, here a finger tip 2, from different perspectives. It has to be taken into consideration here that the mirrors 701 to 705 arranged in FIG. 9 embrace the region up to 360°, and thus the complete circumference of the finger 2 can be projected, while in FIG. 10 the modification with five mirrors, which is seen as sufficient, embraces a region of 180°. It has to be taken into special consideration here that the image and/or collection of the respective regions is carried out in each case overlapping so that each region has for the respective adjacent region a common overlapping region. This means that, for example, the mirrors 701, 702 have a common adjacent region of the finger which then project a three dimensional picture in the form of an exact 3-D-model. First of all, the regions are only collected via the mirrors as pictures. A conversion into digital data can be carried out, for example, in the sensor or detector which then transmits these data to a computer. There the computer-aided evaluation is carried out by means of suitable software. This software then compares the pictures investigated and then converted in digital data with data of the test person(s) stored in the computer. Therefore it is possible by means of the device, respectively the method, according to the invention to generate in a first phase, first of all, an exact image in the form of a three dimensional picture, and only in a second phase to carry out the identification, respectively evaluation, by means of the software. It is thus possible to carry out an evaluation by means of images as well as to carry out this evaluation in a more comfortable modification of the invention computer-aided. It is in particular mentioned one more time that the collected regions which overlap are not combined in the form of a panoramic picture, but that actually, by means of overlapping regions, a three dimensional, exact 3-D-model is generated.

In the frame of this application the applicant reserves the right to claim individual protection for the different aspects of the invention described here. In particular, the applicant reserves the right to claim individual protection, for example in the frame of a divisional application, for the subject matter according to FIGS. 7, 8, 9, 10, respectively for the use of the effect of fractal light for generating a three dimensional picture of a superficies surface. In this case the applicant in particular reserves the right to make the characteristics mentioned before individually a subject matter of individual applications, and to claim and understand them independently from the subject matter described for example in claim 1. Nevertheless the applicant also reserves the right to see herewith all other characteristics in a suitable way as disclosed and described in a suitable way, in particular to avoid unnecessary repetitions at present. The applicant reserves in particular the right to combine the characteristics in any way possible, these are also disclosed.

The claims filed with the application now and to be filed later on are attempted formulations without prejudice for obtaining a broader protection.

If here, on closer examination, in particular also of the relevant prior art, it turns out that one or the other feature may be convenient for the am of the invention, however, not decisively important, of course, already now a formulation is striven for which does not contain anymore such a feature, in particular in the main claim.

References in the sub-claims relate to the further design of the matter of the main claim through the characteristics of the respective sub-claim. These are, however, not to be understood as a waiver of independent protection of the matter for the characteristics of the referred sub-claims.

Characteristics only disclosed in the description so far may now, in the course of proceedings, be claimed as being of inventive relevance, for example to distinguish from the state of the art.

Characteristics only disclosed in the description or even single characteristics from claims which comprise a variety of characteristics may be used at any time to distinguish from the state of the art in the first claim, and this is even if such characteristics have been mentioned in connection with other characteristics, respectively achieve particularly convenient results in connection with other characteristics.

The invention claimed is:

1. A device for collecting biometric data, in particular finger prints, the device having an optically active detector for recording a surface of body areas, and a light source is provided, characterised in that the device has at least one identification arrangement for the superficies finger surface, and characterised in that the identification arrangement for the superficies finger surface comprises at least one or several deviation mirrors, the deviation mirrors being arranged concentrically to an idealized longitudinal axis of the finger, and to image the finger region decisive for the data collection from nail to nail and in an arc angle segment of at least 180° of a circumference of the superficies finger surface, and characterised in that the device has a supporting surface for the hand or the fingers, and in the supporting surface a line sensor is provided which extends over the complete width of the hand, and characterized in that there is relative movement between the line sensor and the hand for recording the hand or finger lines, further characterized in that a sequence of narrowly striped picture segments is produced; and a groove is provided in the supporting surface to separate the line sensor and the surface of the hand.

2. The device according to claim 1, characterised in that each finger has its own identification arrangement for the superficies surface of fingers.

3. The device according to claim 1, characterised in that the identification arrangement for the superficies surface of the fingers further comprises a projection lens and an image-recording unit.

4. The device according to claim 3, characterised in that the deviation mirrors of adjoining identification arrangements for the superficies surface of the fingers are arranged staggered to each other.

5. The device according to claim 1, characterised in that the identification arrangement for the superficies surface for the fingers comprises several deviation mirrors, and each deviation mirror reproduces single regions of the superficies surface of the finger.

6. The device according to claim 1, characterised in that a semipermeable mirror designed as partial mirror for introducing the light of an illumination in the beam path is provided, and parts of the mirror(s) are arranged between the body areas to be recorded, in such a way that at least a large part of the body area is reproduced or collected.

7. The device according to claim 1, characterized in that a semipermeable mirror designed as partial mirror for introducing the light of an illumination in the beam path is provided, and the mirror(s) is/are arranged in such a way that at least a large part of the body area to be reproduced or collected is collected from several angles of view in such a way that an exactly three-dimensional picture is created or calculated as 3-D module.

8. The device according to claim 1, characterised in that as light source for the body area to be scanned an artificial illumination or a natural light source is provided.

9. The device according to claim 1, characterised in that in the device a first part of the identification arrangement for the lines of fingers serves for identifying the finger lines of the first hand, and a second part of the identification arrangement for the finger lines serves for identifying the finger lines of the second hand.

10. The device according to claim 1, characterised in that one or more identification arrangements for the finger lines is/are provided for recording the lines of the first as well as also the second hand.

11. The device according to claim 1, characterised in that one identifying sensor each, in particular in the region of the finger lines arrangement of the left or right thumb, is provided for identifying the first or the second hand.

12. The device according to claim 1, characterised in that a surface of the line sensor facing the hand is set back compared with a supporting surface.

13. The device according to claim 1, characterised in that a supporting surface is provided, and the length of the supporting surface is dimensioned in such a way that the complete hand can be supported.

14. The device according to claim 1, characterised by the line sensor with small width of the line sensor in relation to the length of the hand.

15. The device according to claim 1, characterised by a supporting surface and several spreading means for the fingers arranged at, on or above the supporting surface.

16. The device according to claim 1, characterised by at least one lateral contact surface for guiding the side part of the hand or the side of the hand.

17. The device according to claim 1, characterised in that at least one lateral contact surface for guiding the side part or the side of the hand, and the contact surface is equipped with an image sensor.

18. The device according to claim 1, characterised in that the contact surface is equipped with an image sensor, and the image sensor is set back compared with the supporting surface.

19. The device according to claim 1, characterised in that the hand is guided laterally by one contact surface each.

20. The device according to claim 1, characterised by at least one contact surface, and a lateral, in particular angular or rectangular, mobility of the contact surfaces for the pull-back movement of the hand.

21. The device according to claim 1, characterised in that a contact surface is provided, and an adjusting means, for example a spring, is provided for the movable contact surface.

22. The device according to claim 1, characterised in that an image recording unit is provided, and the image-recording unit is a plane image sensor or a line sensor.

23. The device according to claim 1, characterised in that an image recording unit is provided, and the image recording unit or the line sensor, respectively, is a colour camera.

24. The device according to claim 1, characterised in that one or several deviation mirrors is/are provided, and the superficies surface of the fingers reproduced by one of several deviation mirrors is recorded by one region each of the sensor, preferably of the line sensor.

25. The device according to claim 1, characterised in that one or more deviation mirrors is/are provided, and adjoining deviation mirrors reproduce the superficies surfaces of the fingers to adjoining sensor regions.

26. The device according to claim 1, characterised in that one or more deviation mirrors is/are provided, and each deviation mirror has its own sensor.

27. The device according to claim 1, characterised by the use of light of different wavelengths from the light source for illuminating the finger or the hand, in particular to generate a spatial image of the superficies surface of the fingers or the hand on the line sensor or the image recording unit.

28. The device according to claim 1, characterised in that a deviation mirror is provided, and the deviation mirror is shaped like a ring or half-ring, flat, plane or cone-like.

29. The device according to claim 1, characterised in that the arc angle of the deviation mirror is 180° to 360°.

30. The device according to claim 1, characterised in that the identification arrangement for the superficies surface of the fingers is formed by an individual line sensor.

31. The device according to claim 1, characterised in that the line sensor of the identification arrangement for the superficies surface of the fingers and the image sensor or the contact surface are each designed modularly.

32. The device according to claim 1, characterised in that the device is designed modularly, and, if necessary, can be equipped with an identification arrangement for the superficies surface of the fingers, and/or an image sensor or a contact surface.

33. The device according to claim 1, characterised in that an image recording key is provided, in particular at a spreading means, which serves for starting the recording of the finger line or the superficies surface line of the fingers, and/or the individual superficies surface of the fingers.

34. The device according to claim 1, characterised in that a deviation mirror and a spreading means are provided, and the deviation mirror is arranged close to the spreading means.

* * * * *